United States Patent [19]

Hayashida

[11] 4,417,500
[45] Nov. 29, 1983

[54] AIR PRESSURE SERVOMOTOR

[75] Inventor: Yoshihiro Hayashida, Kawasaki, Japan

[73] Assignee: Tokico Ltd., Kanagawa, Japan

[21] Appl. No.: 44,104

[22] Filed: May 31, 1979

[30] Foreign Application Priority Data

May 31, 1978 [JP] Japan ................................ 53-65493

[51] Int. Cl.³ ..................... F15B 9/10; F01B 19/00; F16J 3/02
[52] U.S. Cl. ............................ 91/369 A; 91/376 R; 60/547.1; 92/98 D
[58] Field of Search ............ 91/369 A, 369 B, 369 R, 91/376 R; 60/547 R; 92/169, 166, 165 R, 165 PR, 98 R, 98 D, 99

[56] References Cited

U.S. PATENT DOCUMENTS

| 2,369,797 | 2/1945 | Rappl | 92/169 |
| 3,537,358 | 11/1970 | Bunyard | 92/166 |
| 4,095,509 | 1/1978 | Tateoka | 91/369 B |

FOREIGN PATENT DOCUMENTS

| 2845794 | 4/1979 | Fed. Rep. of Germany ... | 91/369 A |
| 2922299 | 12/1979 | Fed. Rep. of Germany ... | 91/369 A |
| 2009871 | 6/1979 | United Kingdom .......... | 92/165 PR |

Primary Examiner—Paul E. Maslousky
Attorney, Agent, or Firm—Wenderoth, Lind & Ponack

[57] ABSTRACT

Air pressure servomotor including front shell and rear shell coupled to said front shell so as to construct a housing, a diaphragm disposed in the housing, a piston plate located adjacent the diaphragm, input rod and output rod. The front and rear shells hold a cylinder structure which extends axially from the wall of the front shell to the wall of the rear shell and supports the shells axially, and which has slits running from the forward end to the intermediate portion thereof. A valve having a valve mechanism is slidably disposed in the cylinder structure and having a valve mechanism. Said input rod is connected to the foot pedal and the output rod is connected to the master cylinder. And when the foot pedal is operated to actuate the input rod, the action of the input rod is amplified by the operation of the valve mechanism and the piston plate and transmitted to the output rod therethrough, and then the master cylinder is actuated. During this operation, the cylinder structure supports the front and rear shells and prevents them from deforming, so shortening of the stroke of the output rod by the deformation of the shells is avoided.

12 Claims, 5 Drawing Figures

AIR PRESSURE SERVOMOTOR

BACKGROUND OF THE INVENTION

The present invention relates to an air pressure servomotor which has a reinforced shell and in which the stroke of the output rod is not shortened by deformation of the shell.

A prior art air pressure servomotor comprises a housing consisting of a front shell and rear shell, a valve disposed at the center of said housing and being movable axially of the servomotor, a diaphragm located around said valve and extending radially outwardly to the wall of the shell, and piston plate disposed adjacent to the diaphragm and mounted integrally a said valve. A spacer means is mounted on the forward wall of the front shell by a bolt and the servomotor supports a master cylinder through the spacer. The servomotor is secured to the foot board dividing a driver's compartment and the engine space of a vehicle by means of bolts mounted on the wall of the rear shell. In a servomotor mounted on the foot board as above, the force applied to the master cylinder by a driver tramping down on the brake foot pedal must be resisted by the front and rear shells which function as a rigid body or member. However, the strength of these shells of the prior art servomotor is not sufficient to resist the force applied to the master cylinder. Therefore, the prior art servomotor has the disadvantage in that the shells are deformed as the force is applied to the master cylinder, and the stroke of the servomotor is shortened.

One way to avoid the above mentioned disadvantage is to increase the strength of the front and rear shells by making these shells thicker. But, this increases the weight of the servomotor unnecessarily and uses more material for producing the servomotor than is desirable.

It is an object of the present invention to provide an air pressure servomotor which can fully resist the force applied to the master cylinder without the necessity of making the shells thicker.

SUMMARY OF THE INVENTION

The air pressure servomotor of the present invention comprises a front shell and a rear shell coupled to each other, and a cylinder structure securing said front and rear shells and extending therebetween for coupling these two shells. The cylinder structure has a plurality of slits running from the forward end to the intermediate portion of the cylinder structure. A valve is held within the cylinder structure, and this valve is axially slidable within the cylinder structure. A diaphragm is sealed around the cylinder structure and extends radially outwardly from said cylinder structure to the inner side of the wall of the shells so as to divide the space with the shells into the chambers. A piston plate is located adjacent the diaphragm and is connected to the valve and the output rod supported thereon. When an input rod which is engaged with the valve operates the valve mechanism of the valve, the piston plate moves within the shells with the diaphragm and moves the output rod by applying a thrust to the valve.

Because a cylinder structure extends between the front shell and rear shell and functions as a support for these shells as described above, the deformation of the shells during the servomotor's action is substantially decreased and the efficiency of the servomotor becomes higher. In particular because little force acts on the front and rear shells, these shells can be made thinner or these shells can be made of synthetic resin which is easy to work, thereby lowering the production cost of the servomotor. And, because the cylinder structure can act to couple front shell and rear shell to each other, it is not necessary to provide a flange on the periphery of these shells for connecting them to each other.

The invention will be described further, by way of example, with reference to the accompanying drawings.

DETAILED DESCRIPTION OF THE PREFERRED EMBODIMENT

Figure 1:
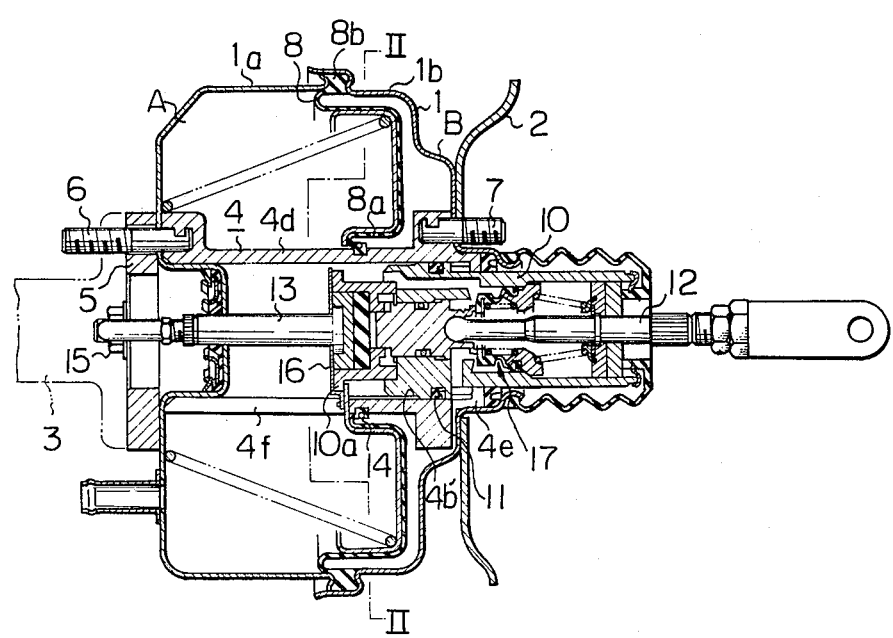
FIG. 1 is a section taken along line I—I of FIG. 2 for showing the servomotor of the present invention.

FIG. 1 is a section showing the servomotor of the present invention. The servomotor 1 includes a housing consisting of a front shell 1a and a rear shell 1b, a valve 10 slidably held in the front and rear shells 1a, and 1b, a piston plate 9 fixedly mounted on the valve 10 and with the valve constituting a piston, and a diaphragm 8 located outwardly of the valve 10 within the shells 1a, and 1b and extending to the inside of the wall of the shells to divide the space within the shells or housing into two chambers A and B. Valve 10 has a valve mechanism 17 for servo operation and supports an input rod 12 which transmits the operation of foot pedal (not shown) to the valve mechanism 17. The forward end of the valve 10 is connected to the output rod 13 supported by the front shell 1a. The output rod 13 is connected to the piston (not shown) of the master cylinder 3 mounted on the front shell 1a through a spacer 5 so that the output rod 13 transmits the movement of the valve 10 to said piston.

Figure 4:
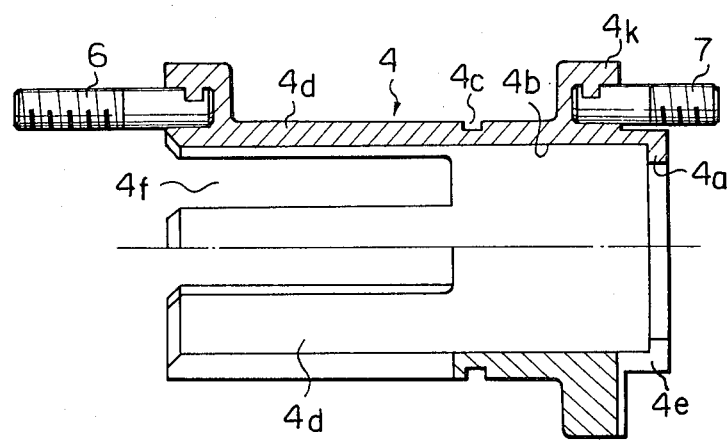
FIG. 4 is a section taken along IV—IV of FIG. 5 for showing the cylinder structure.
Figure 5:
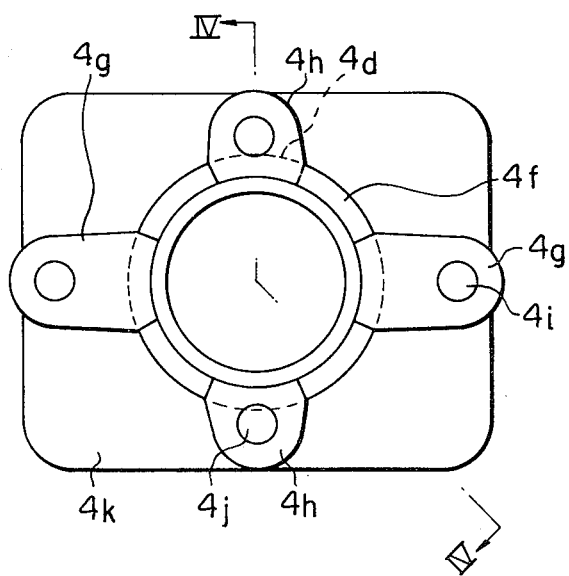
FIG. 5 is an elevational view of the cylinder structure.

Cylinder structure 4 is disposed in the servomotor housing and extends from the forward wall of the front shell 1a to the wall of the rear shell 1b. The cylinder structure 4 is made of metal material or relatively rigid synthetic resin and is cylindrical in shape, and the forward portion is provided with four slits 4f and divided thereby into four foot means 4d, and the rearward portion of which is a hollow cylinder means 4b (FIG. 4). The rearward end of the cylinder means 4b is open and has a land portion 4a projecting radially inwardly and an air passage 4e which passes air between the cylinder structure 4 and rear shell 1b. The land portion 4a functions as a stop when the valve 10 is installed in the cylinder structure 4 and slides in the cylinder structure in the forward and rearward directions in such a manner that the valve is sealed by the sealing member 11 inserted between the peripheral wall of the valve 10 and the inner wall of the cylinder structure 4. A channel 4c is formed around the periphery of the cylinder structure 4, into which the inner edge 8a of the diaphragm 8 is inserted and sealed by a suitable clamping member such as retaining ring 14. Further, as shown in FIG. 5, at the forward end of the foot means 4d of the cylinder structure 4, the right hand and left hand foot means have integrally formed arm parts 4g respectively which have holes 4i for holding bolts 15 to hold the spacer 5 (FIG.

1) on the forward wall of the front shell 1a, and the upper and lower foot means have integrally formed plate parts 4h respectively which have holes 4j for holding bolts 6 for supporting the master cylinder 3 on the front shell 1a through the spacer 5. The master cylinder 3 and the spacer 5 are secured to the front shell 1a by means of the bolts 6 and 15 as above described, and the cylinder structure 4 is also secured thereby to the front shell (FIG. 1). The rearward end of the cylinder structure 4 is provided with a flange 4k which has holes for receiving bolts 7 for connecting the flange 4k and rear shell 1b so as to secure the cylinder structure to the rear shell 1b.

Figure 2:
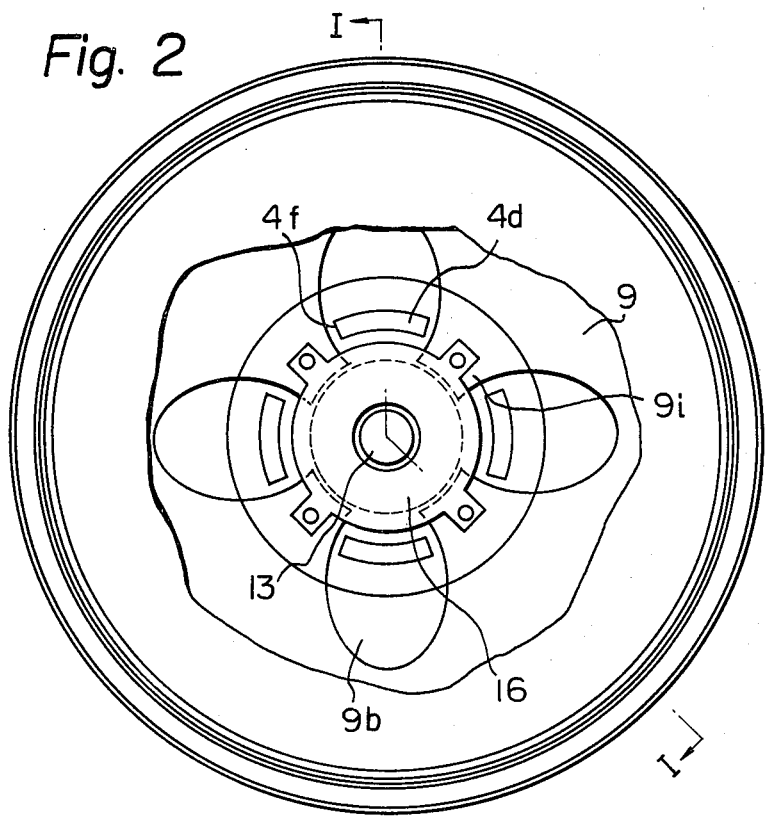
FIG. 2 is a section taken along II—II of FIG. 1.
Figure 3:
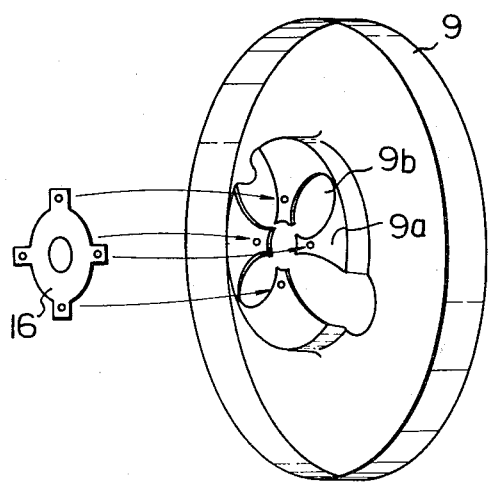
FIG. 3 is a perspective view of the piston plate included in the servomotor of the present invention.

The piston plate 9 has slits 9b extending radially outwardly so as to receive the foot means 4b of the cylinder structure 4, and tongues 9a which enter the cylinder structure 4 through the slits 4f (FIGS. 2 and 3). FIG. 2 shows the piston plate 9 which is mounted on the valve. The piston plate 9 is combined with the cylinder structure 4 from its forward end with the tongues 9a being inserted in the slits 4f; thereafter the piston plate 9 is engaged with the flange 10a of the valve 10 which is disposed in the cylinder structure, and the piston plate 9 and the valve 10 are connected by the connecting means 16 and tongues 9a clipping the flange 1a so that they can slide along the cylinder structure integrally.

The servomotor 1 mounting the master cylinder is secured to the toe board 2 of the vehicle by the bolts 7 mounted on the flange 4k which are inserted in the holes formed in toe board 2 and locked with the nuts. Then the servomotor 1 installed on the vehicle operates as a servo device. When an operator operates the foot pedal, the input rod 12 moves forward (to the left hand direction in FIG. 1) and the air connection between the chambers A and B through the air passage is cut off. Then the diaphragm 8 outer periphery 8b of which is secured to the front and rear shells and inner periphery 8a of which is secured into the channel 4c moves forward by the pressure difference between the chambers A and B and applies a piston action on the piston plate. Because the piston plate is connected to the valve 10 through the flange 10a, the action of the foot pedal is transmitted to the output rod 13 by the sliding action of the piston plate 9 and the valve 10 and thereby the piston of the master cylinder 3 engaged with the distal end of the output rod is operated. In this operation, the piston plate 9 can slide forward and rearward smoothly along the forward portion on foot means 4d of the cylinder structure, because the slits 9b of the piston plate 9 releasably receive the foot means 4d of the cylinder sturcture and the tongues 9a of the piston plate 9 enter the slits 4f of the cylinder structure loosely. During this operation, the cylinder structure 4 made of a rigid material supports the front and rear shells 1a and 1b as a reinforcing member. Thus, the reaction of the force applied to the master cylinder 3 by the operation of the foot pedal is transmitted from the master cylinder 3 to the foot board 2 through the cylinder structure 4. As will be noted from this operation, no tension is applied to the front and rear shells 1a and 1b or if applied, the minimum tension is applied thereto so as to resist the reaction transmitted from the master cylinder 3 to the servomotor 1. Thus, the deformation of the front and rear shells 1a and 1b is substantially reduced and the technical problem relative to the loss of stroke in prior art servomotors is substantially overcome.

What I claim is:

1. A brake booster for a braking system comprising a housing having first and second spaced opposing housing walls, a movable wall disposed in the housing between said spaced housing walls and dividing said housing into two chambers, axially aligned input and output members, means interconnecting said movable wall to said output member, a control valve assembly operated by said input member for controlling a pressure differential across said movable wall, a tubular member extending through the movable wall coaxially with the input and output members and connected to the opposing housing walls, said tubular member having longitudinal slot means disposed between said opposing housing walls with a portion of the interconnecting means extending through the slot means, said control valve assembly including a valve body slidably disposed within said tubular member.

2. A servo booster assembly as in claim 1, in which said movable wall comprises a flexible diaphragm and a piston plate, the flexible diaphragm having the outer periphery sealingly attached to said housing, and having the inner periphery sealingly attached to said tubular member.

3. A servo-booster assembly as claimed in claim 2 in which said slot means comprises a plurality of slots in said tubular member and each slot extending axially of the tubular member.

4. A servo-booster assembly as claimed in claim 1, in which said slot means comprises a plurality of slots in said tubular member and each slot extending axially of the tubular member.

5. A servo-booster assembly as claimed in claim 1 in which said tubular member has at least two opposite ends, one of said ends being connected to said first housing wall defining an opening for placing one of said chambers at said one end of said tubular member in communication with said control valve assembly.

6. A brake booster as claimed in claim 1 in which said slot means in said tubular member is a plurality of circumferentially equally spaced slots, and said interconnecting means being arms extending from said movable wall through said slots.

7. A brake booster as claimed in claim 6 in which said slots are axially extending slots and each arm extends substantially radially through the corresponding slot.

8. A brake booster as claimed in claim 1 in which said housing comprises two opposed housing shells, and said first and second housing walls comprises central portions of the respective shells.

9. A brake booster as claimed in claim 1 further comprising a thrust assembly between said input and output members and constituted by a tubular body housing a resilient reaction disc.

10. A brake booster as claimed in claim 9 wherein said movable wall comprises a diaphragm and a diaphragm support plate and having integral connections between said tubular body, said diaphragm support plate and said arms.

11. A brake booster as claimed in claim 1 wherein said movable wall has a diaphragm support plate with a tubular portion being co-axial with and spaced radially outwardly from the outer surface of said tubular member, and a seal means constituted by a rolling diaphragm for rolling between the radially outer surface of said tubular member and the radially inner surface of said tubular portion.

12. A brake booster as claimed in claim 11 further comprising a main diaphragm against said movable wall which is sealed to said housing at the radially outer periphery thereof and is integral with said rolling diaphragm.

* * * * *